A. CONTI.
SYSTEM OF MARINE PROPULSION.
APPLICATION FILED DEC. 9, 1915.

1,342,797.

Patented June 8, 1920.
2 SHEETS—SHEET 1.

Center Line of Ship

Inventor:
Angelo Conti,
By Dodge & Sons
Attorneys.

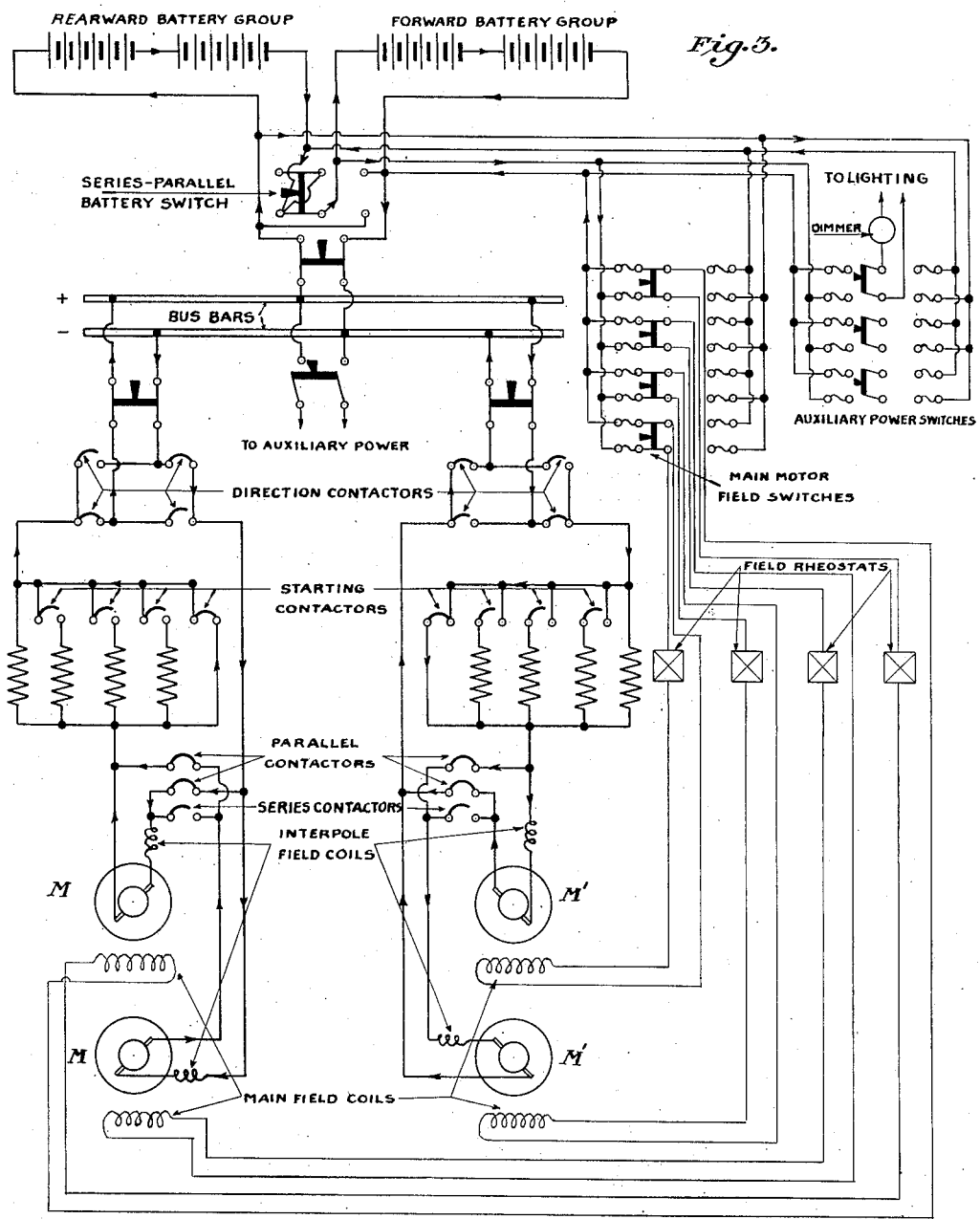

UNITED STATES PATENT OFFICE.

ANGELO CONTI, OF WASHINGTON, DISTRICT OF COLUMBIA.

SYSTEM OF MARINE PROPULSION.

1,342,797.  Specification of Letters Patent.  Patented June 8, 1920.

Application filed December 9, 1915. Serial No. 65,953.

*To all whom it may concern:*

Be it known that I, ANGELO CONTI, a citizen of the United States, residing at Washington, in the District of Columbia, have invented a certain new and useful Improvement in Systems of Marine Propulsion, of which the following is a specification.

This invention relates to the adaptation of steam and electric machinery for the propulsion of vessels, and particularly submersible vessels, by means of steam turbines and dynamo-electric machines connected through a suitable transmission gearing to the propelling shafts, in combination with steam generators, auxiliary machinery, and storage batteries for the production and conservation of the motive power.

Steam turbines, in order to develop their best efficiency, should be run at high speed, and therefore they cannot advantageously be connected directly to the propeller shaft. In regard to electromotors for submerged propulsion, the present day practice of mounting them directly on the main propelling shafts leads to cumbersome and heavy machines, as the rotative speeds of the main shafts are usually kept low to insure good propulsive efficiency. By the interposition of a suitable transmission, such as mechanical gearing, the rotative speed of each driving unit can be increased to a convenient figure, thereby affording economical operation at all speeds, both when the vessel is operating on the surface or when submerged.

The object of this invention is to provide a propelling mechanism which shall efficiently perform the various duties required of a modern submarine vessel, such as the production of large power to obtain high surface speed, the economical production of moderate power for protracted cruising, the conversion of mechanical power into electrical energy, the conservation of this energy in storage batteries, and the reconversion of this electrical energy into propulsive power.

Figure 1:
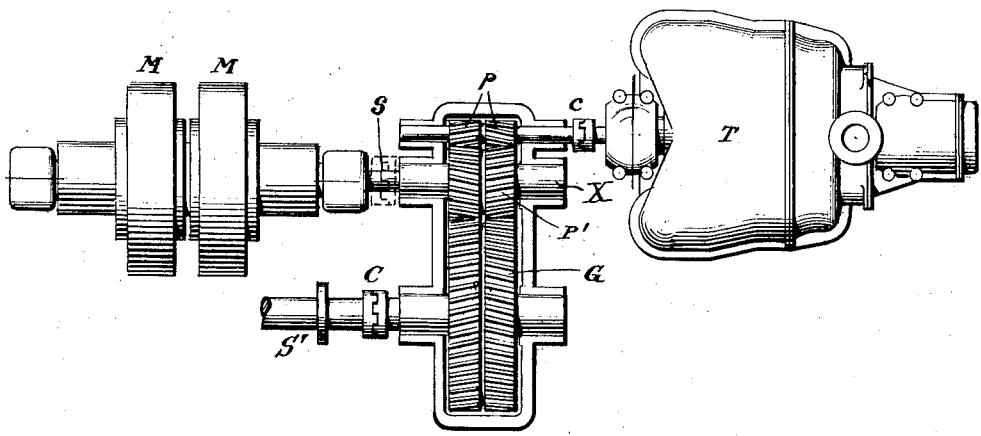
Figure 2:
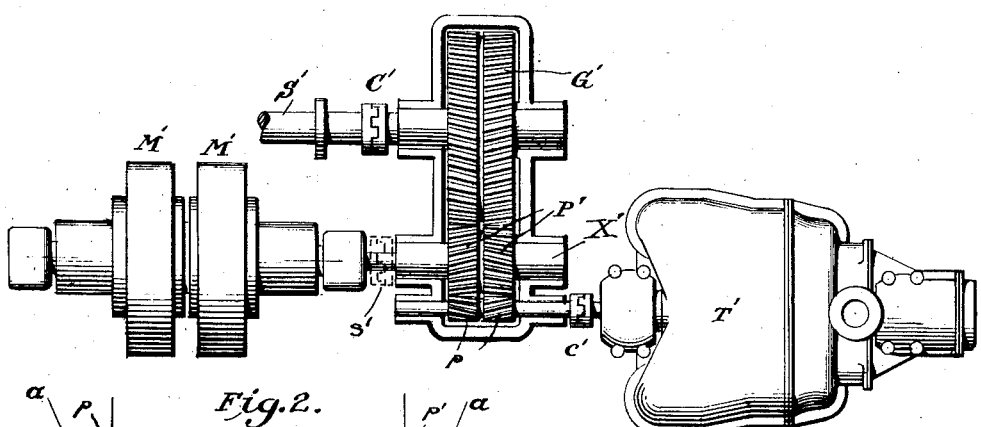
Figure 2:
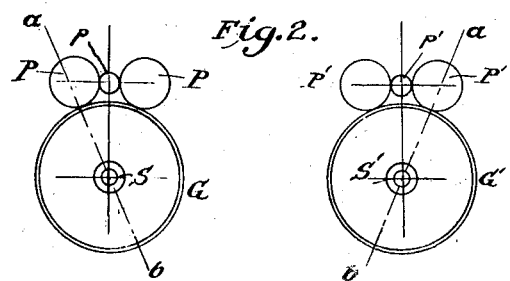

In the accompanying drawings:

Figure 1 represents diagrammatically a twin-screw installation embodying my invention;

Fig. 2 a diagrammatic elevation of the gearing, for the purpose of better showing the lines on which the section is taken in Fig. 1;

Fig. 3, a wiring diagram showing one wiring system suitable to the carrying out of my invention.

Referring to Fig. 1, T, T' represent two steam turbines, preferably of the multistage, high-speed, high-efficiency type, governed as to speed by either nozzle or throttle control, according to the variations in load. The power generated by T, T' is transmitted to propelling shafts S, S' by means of high-speed toothed pinions p, p', each meshing with a pair of intermediate idlers P, P', which in turn mesh with main gears G, G', mounted on main propelling shafts S, S'. On each side of the vessel the shaft X or X' of one of the intermediate idlers is extended and coupled to the armature of a direct-current dynamo-electric machine M, M', preferably of the high-speed, shunt-wound, interpole type, provided with field control, which can be used either as a motor or as a generator. Any other suitable motor-generator unit may be substituted at will. Clutches c, c' and C, C' are provided between turbines T, T' and pinions p, p', and between main gears G, G' and propelling shafts S, S', respectively.

The relative positions of pinions, idlers and gears are shown diagrammatically as an end view by Fig. 2, but for the sake of clearness, Fig. 1 is drawn as a developed section with the axes of the pinion p, idler P and gear G, and the axes of the pinion p', idler P' and gear G' lying in a common plane. The true arrangement is illustrated in Fig. 2 from which it will be noted that the pinions p and p' are above their respective gears G and G' and that a pair of idlers P and a pair of idlers P' are used.

When the vessel is operating at high speed on the surface, steam is admitted to both turbines T, T', and their power is transmitted to shafts X, X' and S, S' through gearings p, P, G and p', P', G'. Dynamo-electric machines M, M' will then operate as generators, and they can be connected to the storage battery B, Fig. 3, so as to charge it or to float on it, or the storage battery may be by-passed and the electrical energy thus produced may be used directly for auxiliary services, in which case, if the amount of electrical energy required be small, only one generator need be used for this purpose, the other generator running idle as a conjoint centrifugal means.

When the vessel is operating at lower speeds on the surface, within the range of power at which dynamo-electric machines M, M' can continuously perform, steam will be admitted to only one of the turbines, the other turbine being disconnected by means of its own clutch. The turbine in operation will transmit power to its propeller and also drive its own dynamo-electric machine, which will then operate as a generator, and whose power will be transmitted electrically to the dynamo-electric machine on the other shaft, which will act as a motor and so drive the other propeller. By proper control of the amount of steam to the turbine, the dynamo-electric machine operating as a generator can also be made to produce the excess of electrical power that may be required for auxiliary purposes.

When the vessel is running submerged, both turbines are disconnected, and dynamo-electric machines M, M' will operate as motors, receiving current from the storage battery B, which will also supply current for auxiliary purposes, such as lighting, etc.

Under any of the above conditions, backing and maneuvering will be effected by dynamo-electric machines M, M' acting as reversible motors, with current supplied by the battery, while turbines T, T' may be disconnected through clutches c, c'.

When the vessel is at rest, battery charging may be accomplished by disconnecting the propeller shafts S, S' by means of clutches C, C', steam being admitted to one or both of the turbines T, T' which will drive dynamo-electric machines M, M', which will then operate as generators, through gearing p, P, p', P', and while main gears G, G' revolve idle without appreciable loss of power.

When the vessel is at rest and no steam is available, current for auxiliary purposes can be obtained from the battery.

The wiring shown in Fig. 3 is arranged so as to allow the electrical equipment to accomplish the various functions already described, and illustrates one of various wiring plans that may be adopted. As, however, the condition corresponding to surface cruising speed when only one turbine is used to operate one set of dynamo-electric machines as generators to supply current to the other set of dynamo-electric machines, which then operate as motors, is the one for which special advantages are claimed, the various switches and contactors are here shown in the position corresponding to the above condition.

The wiring diagram allows a series-parallel arrangement of the dynamo-electric machines, and of the two halves of the battery, or both. Starting, stopping, and reversing of dynamo-electric machines is effected by means of starting resistances and contactors, series-parallel contactors, and direction contactors, arranged in two groups, one group for each pair of dynamo-electric machines, all contactors of the same group being operated by a master-controller of usual type. Each contactor is operated by a solenoid connected to the master-controller, and as the handle of this controller is moved to its various positions, contacts are made or broken corresponding to the condition sought, as is well understood in this art. For the sake of simplicity, the master-controllers and their wiring to the contactors are omitted from Fig. 3, as they constitute no necessary part of my invention.

Intermediate speed regulation of the main motors between the steps afforded by the series-parallel arrangement is obtained by field control, the field of each dynamo-electric machine being separately excited with current from the storage battery through a group of double-pole switches, which can be connected to either half of the battery.

As shown in Fig. 3, dynamo-electric machines M, M operate as generators, and are connected in parallel for the production of maximum power with all resistance out. The current generated passes through the parallel contactors to the proper starting and direction contactors, and through the main cut-out switch to the bus-bars, from which it flows through a similar system to dynamo-electric machines M', M', operating as motors. The two halves of the battery are shown connected in series, and, as previously noted, are floating on the line. Connections for lighting and auxiliary power are taken off each group of the battery, and if necessary a connection for auxiliary power at a higher voltage can be taken directly off the bus-bars, as shown.

The advantages of this arrangement are:

First. It affords the adaptation of steam for the propulsion of high-power submarine boats, within the compact space and limited weight usually available for this type of vessel.

Second. It lessens chances of disablement by breakdowns, inasmuch as the vessel can be economically driven at considerable speed from one turbine if the other turbine be deranged.

Third. The connection of dynamo-electric machines to the gearing already provided for the turbines, allows in a very simple way the use of efficient, high-speed dynamo-electric machines of reduced dimensions and weight.

Fourth. It provides means of economical operation at light loads, by doubling the output of one turbine while the other turbine remains idle.

Fifth. As reversal is accomplished only by dynamo-electric machines, no reversing turbine elements are required, thus allowing main turbines of light, simple and compact construction, while the decreased length of turbine rotors and consequent increase of their critical speeds, makes possible the use of turbines running at very high rotative speed.

Finally, this arrangement is very flexible, and is capable of economically performing all the various duties required in the operation of a submarine vessel.

As the skilled engineer will understand, this method of propulsion is susceptible of various modifications and arrangements as to turbines, gears, dynamo-electric machines and clutches, within the spirit and scope of my invention. It lends itself particularly well to adaptation to conventional turbine installations, such for example as turbines including high and low pressure units geared together, in which case various arrangements to avail of this gearing, in conjunction with the gearing characteristic of my invention, will readily suggest themselves.

Referring again to the arrangement illustrated in Fig. 1, additional clutches s, s' could also be installed on the shafts of the dynamo-electric machine, whereby dynamo-electric machines M, M' could be permitted to remain idle when turbines T, T' are running at full speed. In such case electrical power for auxiliary purposes can be obtained from the storage battery or any other suitable source.

I also wish it understood that I do not intend to confine myself to the form of gearing described and shown in Figs. 1 and 2, as any suitable form of reduction gear can be used to accomplish the purpose of my invention, the term "gear" being here used in a comprehensive sense to include any usual speed-reducing mechanism.

The term "dynamo-electric machine" is used throughout the specification to indicate a machine capable of operating as a generator or reversible motor through the manipulation of suitable switches or the like.

Having thus described my invention, what I claim is:—

1. A power plant for propulsion of submersible boats, comprising in combination, two propulsive units, each including a turbine engine, a propeller shaft, a speed reducing gear train including a turbine gear, a propeller drive gear and an intermediate gear, a dynamo-electric machine directly connected with said intermediate gear, and clutches for individually releasing the turbine shaft and the propeller shaft from said reducing gear train; and electric equipment associated with the dynamo-electric machines of said two propulsive units and including a storage battery, and electric connections and switches between said dynamo-electric machines and said battery, adapted, at the will of the operator, to connect the dynamo-electric machines in driving and driven relation one to the other, in battery charging relation or in motor driving relation, and to reverse the direction of either dynamo-electric machine when operating as a motor.

2. A power plant for propulsion of submersible boats, comprising a pair of propeller shafts; a pair of steam turbines; gears carried by the propeller shafts; pinions carried by the turbine shafts; clutches connecting said pinions and turbine shafts; a gear intermediate the turbine-shaft pinion and the propeller-shaft gear of each turbine and propeller shaft; dynamo-electric machines directly coupled with the shafts of said intermediate gears; electrical connections between said dynamo-electric machines for connecting either in electrical driving relation with the other; and switches for controlling said electrical connections.

3. A power plant for propulsion of submersible boats comprising a turbine engine; a pinion clutch-connected with the shaft of said engine; a propeller shaft; a gear clutch-connected with said propeller shaft; a gear intermediate the turbine pinion and the propeller-shaft gear; a dynamo-electric machine directly connected with the shaft of said intermediate gear; a storage battery; and connections between the dynamo-electric machine and the storage battery, whereby current may be supplied to said battery by the dynamo-electric machine, or delivered from the battery to said dynamo-electric machine to rotate the same as a motor.

4. A power plant for propulsion of submersible boats, comprising in combination, a steam turbine; a propeller shaft; a speed reducing gear train, including an intermediate gear having a rotative speed intermediate that of the turbine and propeller shaft; and a dynamo-electric machine connected with said intermediate gear.

5. A power plant for propulsion of submersible boats, comprising in combination, a pair of steam turbines; a pair of propeller shafts; speed reducing gear trains, one interposed between each turbine and its corresponding propeller shaft, and each including an idle gear rotating at a speed intermediate that of the turbine and propeller shaft; dynamo-electric machines, one connected to each of said idle gears; a storage battery; and electrical connections including controlling switches, interposed between said storage battery and said dynamo-electric machines.

6. In a ship propulsion system, the combination of a plurality of propellers, a separate turbine for driving each of them, a dynamo-electric machine connected with each propeller, and electric equipment associated with the dynamo-electric machines and including a storage battery; and means whereby the dynamo-electric machines may be connected in driving and driven relation one to the other, and in battery-charging relation and in motor driving relation to the battery, and whereby either dynamo-electric machine may be reversed when operating as a motor.

7. A power plant for propulsion of boats, comprising two propulsive units, each including a turbine, a propeller shaft, a speed-reducing gear train including a turbine gear, a propeller drive gear and an intermediate gear, and a dynamo-electric machine connected with said intermediate gear; and electric equipment associated with the dynamo-electric machines of said two propulsive units and including a storage battery, and electric connections and switches between said dynamo-electric machines and said battery, adapted, at the will of the operator, to connect the dynamo-electric machines in driving and driven relation one to the other, in battery-charging relation or in motor driving relation, and to reverse the direction of either dynamo-electric machine when operating as a motor.

8. In a ship propulsion system, the combination of a plurality of propellers, a turbine for each of them, a reduction gearing through which each turbine is connected to its propeller, said reduction gearings each comprising a gear-wheel which rotates at a speed intermediate between that of the turbine and the propeller, dynamo-electric machines directly connected to said intermediate gear wheels, and means for connecting one dynamo-electric machine to another so that one may act as a generator and drive the other as a motor.

9. In a ship propulsion system, the combination of a plurality of propellers, a turbine for each of them, a reduction gearing through which each turbine is connected to its propeller, said reduction gearings each comprising a gear-wheel which rotates at a speed intermediate between that of the turbine and the propeller, dynamo-electric machines directly connected to said intermediate gear wheels, a storage battery, and means for connecting it to said dynamo-electric machines.

10. In a ship propulsion system, the combination of a plurality of propellers, a turbine for each of them, a reduction gearing through which each turbine is connected to its propeller, said reduction gearings each comprising a gear-wheel which rotates at a speed intermediate between that of the turbine and the propeller, dynamo-electric machines directly connected to said intermediate gear-wheels, means for connecting one dynamo-electric machine to another so that one may act as a generator and drive the other as a motor, a storage battery, and means for connecting it to said dynamo-electric machines.

In testimony whereof I have signed my name to this specification.

ANGELO CONTI.